(12) United States Patent
Larsen et al.

(10) Patent No.: US 9,862,115 B2
(45) Date of Patent: Jan. 9, 2018

(54) HIDDEN FEATURE FOR ACCESSING OR REPAIRING MOBILE DEVICES

(71) Applicant: Intel Corporation, Santa Clara, CA (US)

(72) Inventors: Denica N. Larsen, Hillsboro, OR (US); Wing K. Ho, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 14/671,760

(22) Filed: Mar. 27, 2015

(65) Prior Publication Data

US 2016/0279862 A1    Sep. 29, 2016

(51) Int. Cl.
| | | |
|---|---|---|
| *B29C 65/02* | (2006.01) | |
| *B29C 65/48* | (2006.01) | |
| *B32B 43/00* | (2006.01) | |
| *B26F 3/12* | (2006.01) | |
| *G06F 1/16* | (2006.01) | |
| *B29L 31/34* | (2006.01) | |

(52) U.S. Cl.
CPC .............. *B26F 3/12* (2013.01); *G06F 1/1626* (2013.01); *B29L 2031/34* (2013.01); *Y10S 156/924* (2013.01); *Y10S 156/937* (2013.01); *Y10T 156/1153* (2015.01); *Y10T 156/1911* (2015.01)

(58) Field of Classification Search
CPC ......... Y10T 156/1153; Y10T 156/1911; Y10S 156/924; Y10S 156/937; B26F 3/12
See application file for complete search history.

(56) References Cited

U.S. PATENT DOCUMENTS

| | | | | |
|---|---|---|---|---|
| 5,100,494 A | * | 3/1992 | Schmidt | B29C 65/342 156/273.9 |
| 7,150,804 B2 | * | 12/2006 | Tajima | G09F 7/18 156/707 |
| 7,545,629 B1 | | 6/2009 | Bauer et al. | |
| 7,610,783 B2 | * | 11/2009 | Rudduck | B62D 27/00 24/602 |
| 8,118,075 B2 | * | 2/2012 | Sampica | B26D 1/547 156/711 |

(Continued)

OTHER PUBLICATIONS

International Search Report and Written Opinion received for International Application No. PCT/US2016/018514, dated Jun. 1, 2016, 14 pages.

(Continued)

*Primary Examiner* — Mark A Osele
(74) *Attorney, Agent, or Firm* — Alpine Technology Law Group LLC

(57) ABSTRACT

Methods and apparatus relating to provision and/or utilization of a hidden feature for accessing and/or repairing mobile devices are described. An embodiment includes a wire physically adjacent to an adhesive. The adhesive bonds a first portion of a computing device and a second portion of the computing device. The wire is capable of being heated in response to application of electrical voltage or current. In turn, the heated wire causes cutting of the adhesive to allow for physical separation of the first portion of the computing device and the second portion of the computing device. Another embodiment utilizes a hidden end of an opening in a computing device to hide a fastener. Other embodiments are also disclosed and claimed.

10 Claims, 11 Drawing Sheets

(56) References Cited

U.S. PATENT DOCUMENTS

| | | | |
|---|---|---|---|
| 8,222,089 B2 | 7/2012 | Choi et al. | |
| 8,419,896 B2* | 4/2013 | Ciliberti | G02F 1/1303 |
| | | | 156/703 |
| 8,888,953 B2* | 11/2014 | Teck | B26D 3/28 |
| | | | 156/703 |
| 9,182,625 B2* | 11/2015 | Watanabe | G02F 1/133502 |
| 9,618,973 B2* | 4/2017 | Bergmann | G06F 1/1637 |
| 2010/0154992 A1* | 6/2010 | Feinstein | B32B 43/006 |
| | | | 156/711 |
| 2010/0175829 A1 | 7/2010 | Masuda et al. | |
| 2014/0111929 A1 | 4/2014 | Andre et al. | |
| 2014/0252779 A1 | 9/2014 | Toivanen | |
| 2014/0272332 A1* | 9/2014 | Reineman | B32B 7/06 |
| | | | 428/201 |

OTHER PUBLICATIONS

International Preliminary Report on Patentability received for International Application No. PCT/US2016/018514, dated Oct. 12, 2017, 10 pages.

* cited by examiner

HIDDEN FEATURE FOR ACCESSING OR REPAIRING MOBILE DEVICES

FIELD

The present disclosure generally relates to the field of electronics. More particularly, an embodiment relates to provision and/or utilization of a hidden feature for accessing and/or repairing mobile devices.

BACKGROUND

Mobile computing devices are quickly becoming commonplace, e.g., due to their increased battery life as well as improved computing capabilities. One current trend in tablet (or smartphone) design is to permanently seal or bond/glue the display assembly to the chassis. This may minimize the use of fasteners, holes, and/or screws, and enhance the overall system aesthetic. Such design solutions can, however, limit the upgrade, repair, and/or rework potentials for mobile computing devices, e.g., even in the factory environment.

Some repair toolkits may be used to pry open such devices. However, the toolkits may require an operator to have prior knowledge about tearing down such devices, e.g., to ensure no brakeage or damage to the device.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
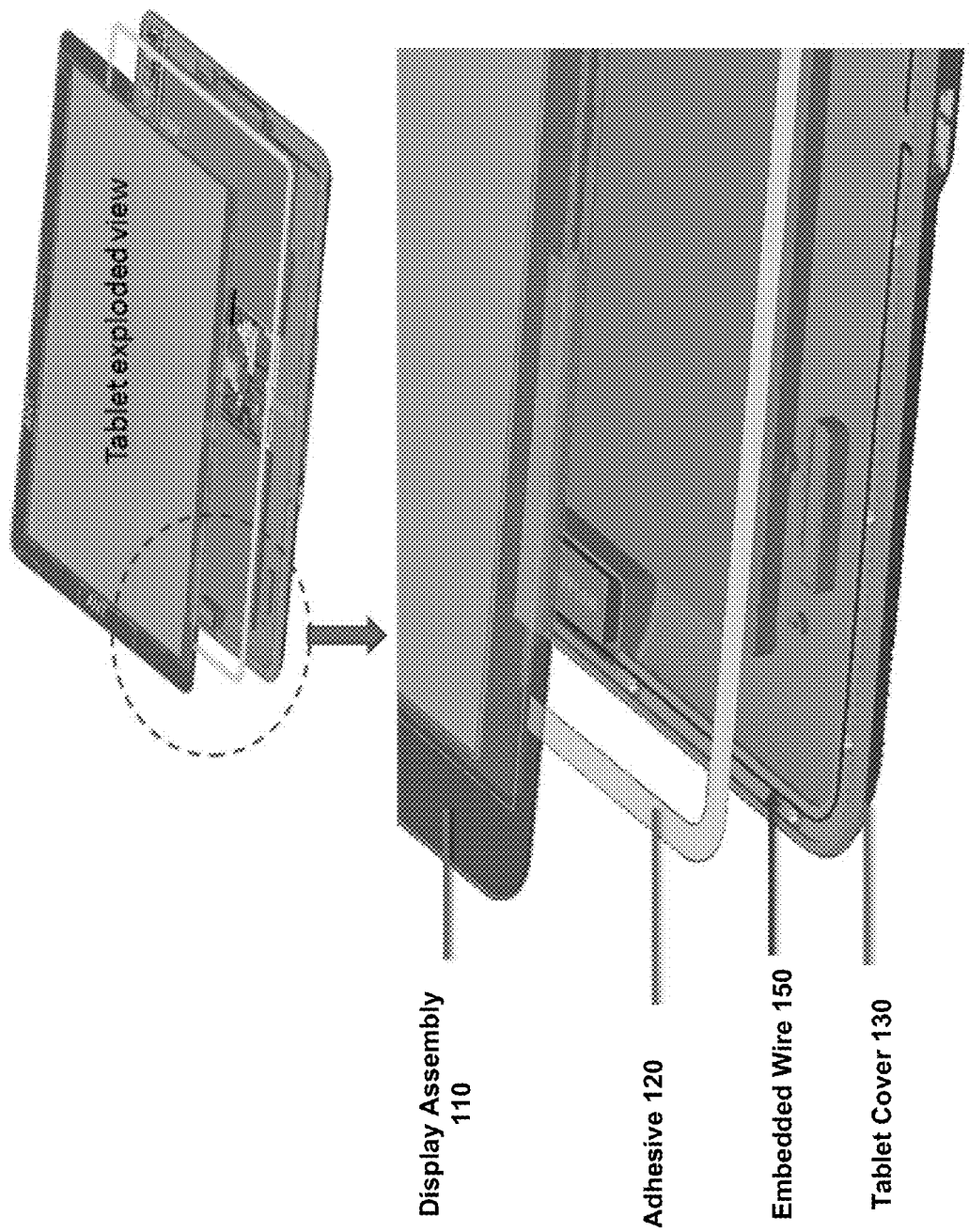
FIG. 1 illustrates an exploded view of a tablet device according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As mentioned above, some current solutions may require specialized tools such as prying tools, a spudger (also referred to as a spludger), heat pads, a heat gun, a suction cup, etc. An operator may have to use a combination of these specialized tools to separate a display assembly from the chassis. The results can be inconsistent, and may have an added risk of causing damage to the chassis housing or crack the display assembly. By contrast, some embodiments provide a consistent solution to access and/or repair a mobile computing device and reduce potential damage to the device while still avoiding the use of fasteners, etc. that may affect the aesthetic of the device.

More particularly, some embodiments provide techniques for provision and/or utilization of a hidden feature for accessing and/or repairing mobile devices. In various embodiments, techniques discussed herein may be applied to different computing systems (such as those discussed with reference to FIGS. 5-8), including mobile computing device (s) (for example, a smartphone, tablet, UMPC (Ultra-Mobile Personal Computer), laptop computer, Ultrabook™ computing device, wearable device (such as a smart watch, smart glasses, a smart bracelet, and the like), etc., and/or non-mobile computing devices including a desktop computer, workstation, computer server (such as a blade server), etc.

For instance, a tablet (or another type of computing device including those mentioned above) can be sealed using adhesive (or other bonding material) that is provided between the display assembly and the chassis. One embodiment provides/utilizes an embedded wire below the adhesive layer (or otherwise physically adjacent to the adhesive or bonding layer used for assembly of the a computing device). When a device needs to be opened/accessed, the embedded wire is heated to effectively cut through the layer of adhesive or bonding material to separate the display assembly (e.g., including a flat panel display device) from the chassis (or device cover). This provides a consistent solution (e.g., as contrasted to existing solutions discussed above such as prying, etc.), and also reduces or eliminates any potential damage to the device while still avoiding the use of fasteners, etc.

In another embodiment, a fastening device (e.g., a pin, button, screw, shaft, or combinations thereof, etc.) is hidden behind the audio jack hole (which is already available in most if not all mobile computing devices). This will allow the mobile device to have seamless look, while still being serviceability, upgradeable, and/or reworkable in production or in the field via the hidden feature. Hence, some embodiments provide seamless access for opening/accessing a product, e.g., for service, upgrade, debug, reworking, etc.

FIG. 1 illustrates an exploded view of a tablet device according to an embodiment. As previously mentioned, embodiments discussed herein are not limited to tablets and may applied to different types of computing systems (such as those discussed with reference to FIGS. 5-8), including mobile computing device(s) (for example, a smartphone, UMPC (Ultra-Mobile Personal Computer), laptop computer, Ultrabook™ computing device, wearable device (such as a smart watch, smart glasses, a smart bracelet, and the like), etc., and/or non-mobile computing devices including a desktop computer, workstation, computer server (such as a blade server), etc.

Referring to FIG. 1, a display assembly is attached (e.g., bonded with adhesive 120 or other material) to a device chassis (or tablet cover 130 in the example shown). An embedded wire 150 is provided physical adjacent to the adhesive 120 (e.g., between the tablet cover 130 and adhesive 120 as shown, or could be between the display assembly 110 and the adhesive 120 (not shown), or both). The shell/channel holding the embedded wire 150 may be made of metal or other heat resistant material such as heat resistant plastic.

In an embodiment, the embedded wire 150 may be any type of wire that is capable of sustaining a sufficient amount of heat (or temperature) for a sufficient duration to effectively cut through the layer of adhesive (or bonding material). The embedded wire may be heated by applying electrical voltage (and/or electrical current) to the wire. The embedded wire may be selected such that shrinkage of the embedded wire (e.g., due to the heat generated in the embedded wire) is limited to about four percent (4%) of its length in some embodiments. As an example, the embedded wire may include one or more of: Nichrome™ wire (or a (e.g., non-magnetic) alloy of nickel, chromium, and optionally iron), Nitinol™ (or an alloy of Nickle and Titanium) wire, nickel (or nickel alloy) wire, cooper (or copper alloy) wire, aluminum (or aluminum alloy) wire, silver (or silver alloy) wire, combinations thereof (e.g., where the embedded wire may include different portions consisting of different material such as the aforementioned material), or alloys thereof.

Figure 2A:
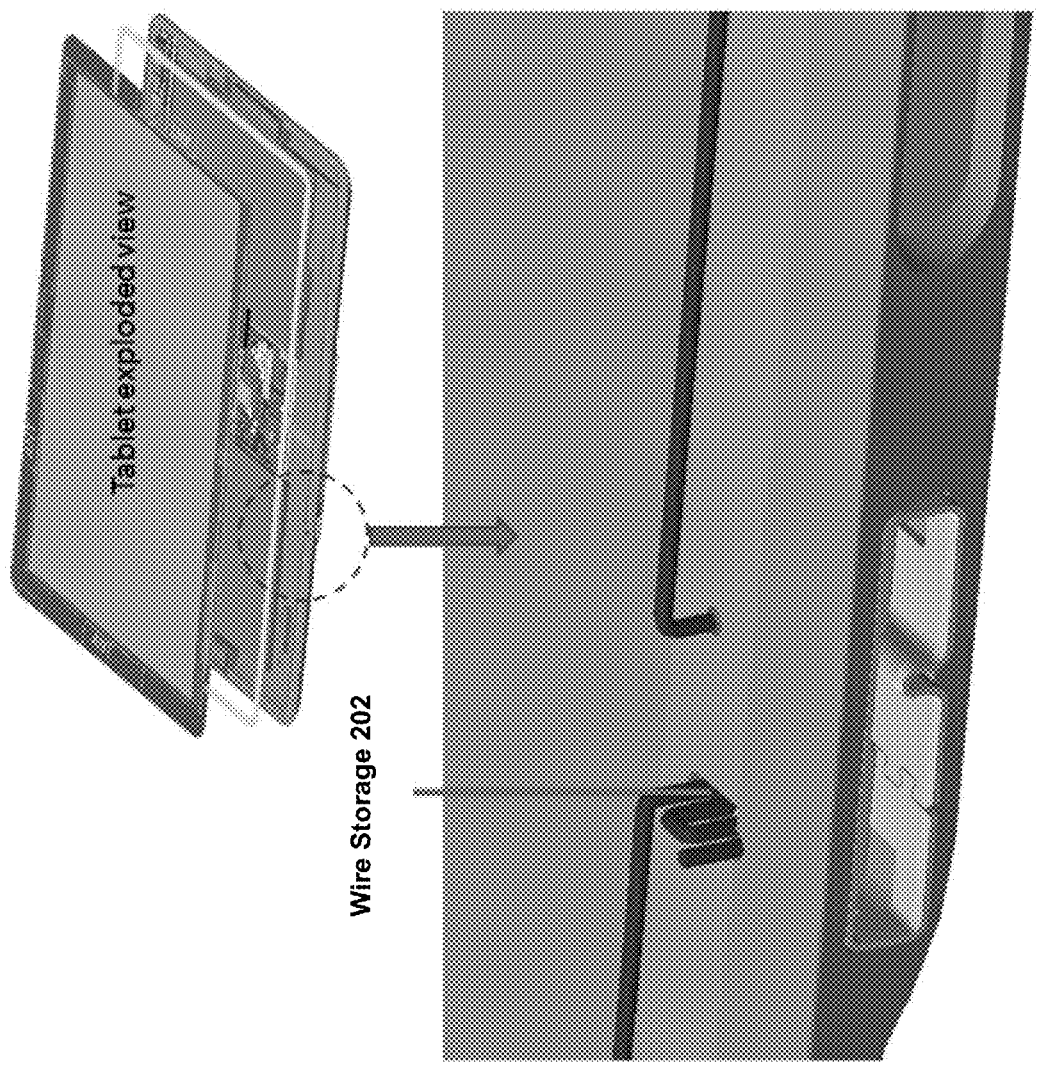
FIG. 2A illustrates an exploded view of a tablet with an embedded wire storage portion, according to an embodiment.
Figure 2B:
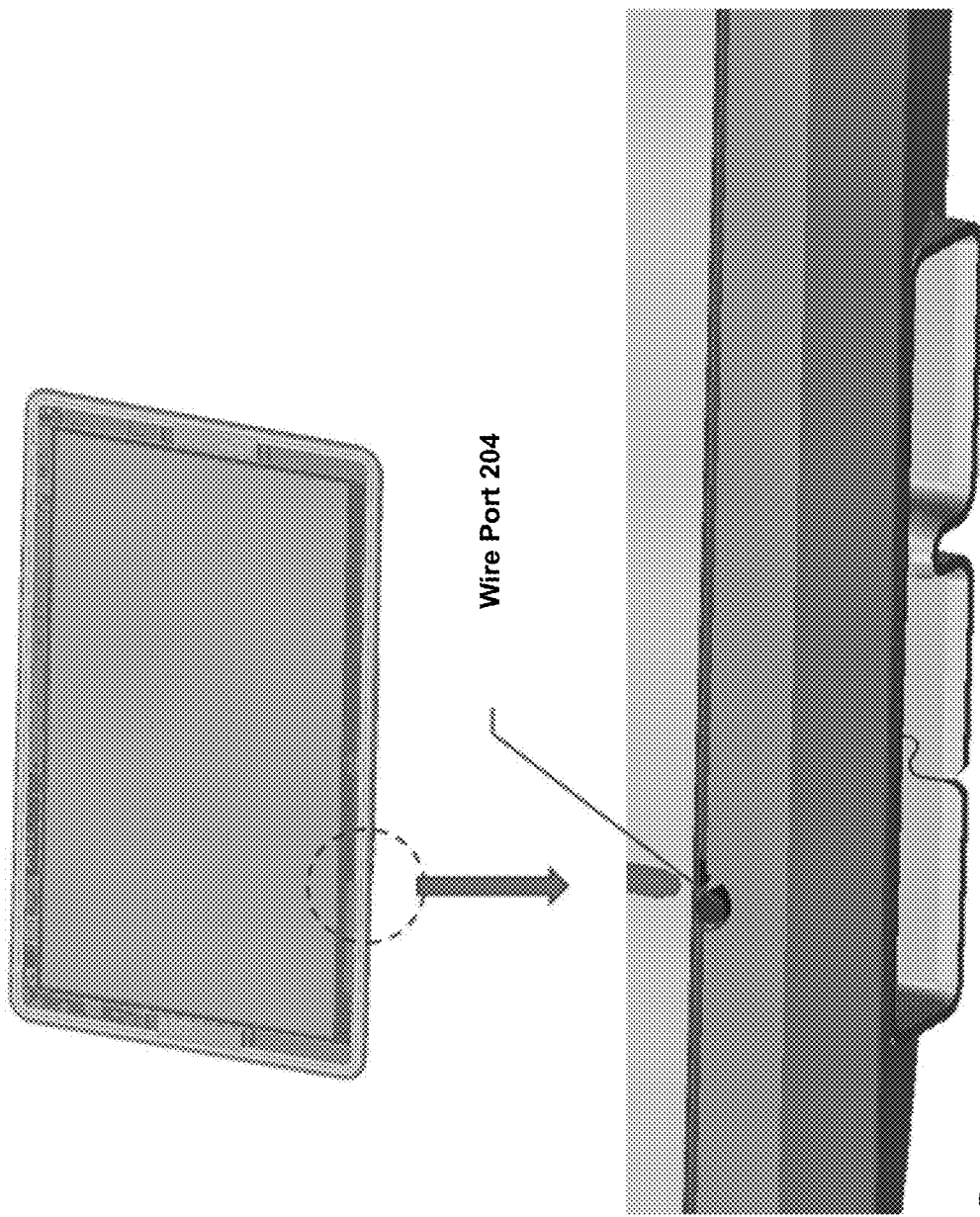
FIG. 2B illustrates an exploded view of a tablet with an embedded wire access port, according to an embodiment.

FIG. 2A illustrates an exploded view of a tablet with an embedded wire storage portion, according to an embodiment. FIG. 2B illustrates an exploded view of a tablet with an embedded wire access port, according to an embodiment (e.g., without distraction to the tablet identity look). As previously mentioned, embodiments discussed herein are not limited to tablets and may applied to different types of computing systems (such as those discussed with reference to FIGS. 5-8), including mobile computing device(s) (for example, a smartphone, UMPC (Ultra-Mobile Personal Computer), laptop computer, Ultrabook™ computing device, wearable device (such as a smart watch, smart glasses, a smart bracelet, and the like), etc., and/or non-mobile computing devices including a desktop computer, workstation, computer server (such as a blade server), etc.

Referring to FIG. 2A, at least one (e.g., coiled) end of the embedded wire may be hidden in a storage pocket 202. Even though FIG. 2A illustrates an end of the embedded wire 150 being stored in the storage pocket 202, embodiments are not limited to this and any portion of the wire (e.g., a middle portion) of the embedded wire may be stored in the storage pocket as well. Hence, the embedded wire is first fished out (or otherwise extracted) from the storage pocket prior to heating (or application of voltage or current). Such embodiments allow for finished systems to be easily accessed, repaired, debugged, reworked, upgraded, etc.; hence, reducing the impact to their environmental footprint and/or without affecting the aesthetic of such devices. Referring to FIG. 2B, a wire port 204 is shown which inconspicuously embeds the wire 150 in a tablet (e.g., to be extracted for access to the wire and application of heat, etc.).

Figure 3:
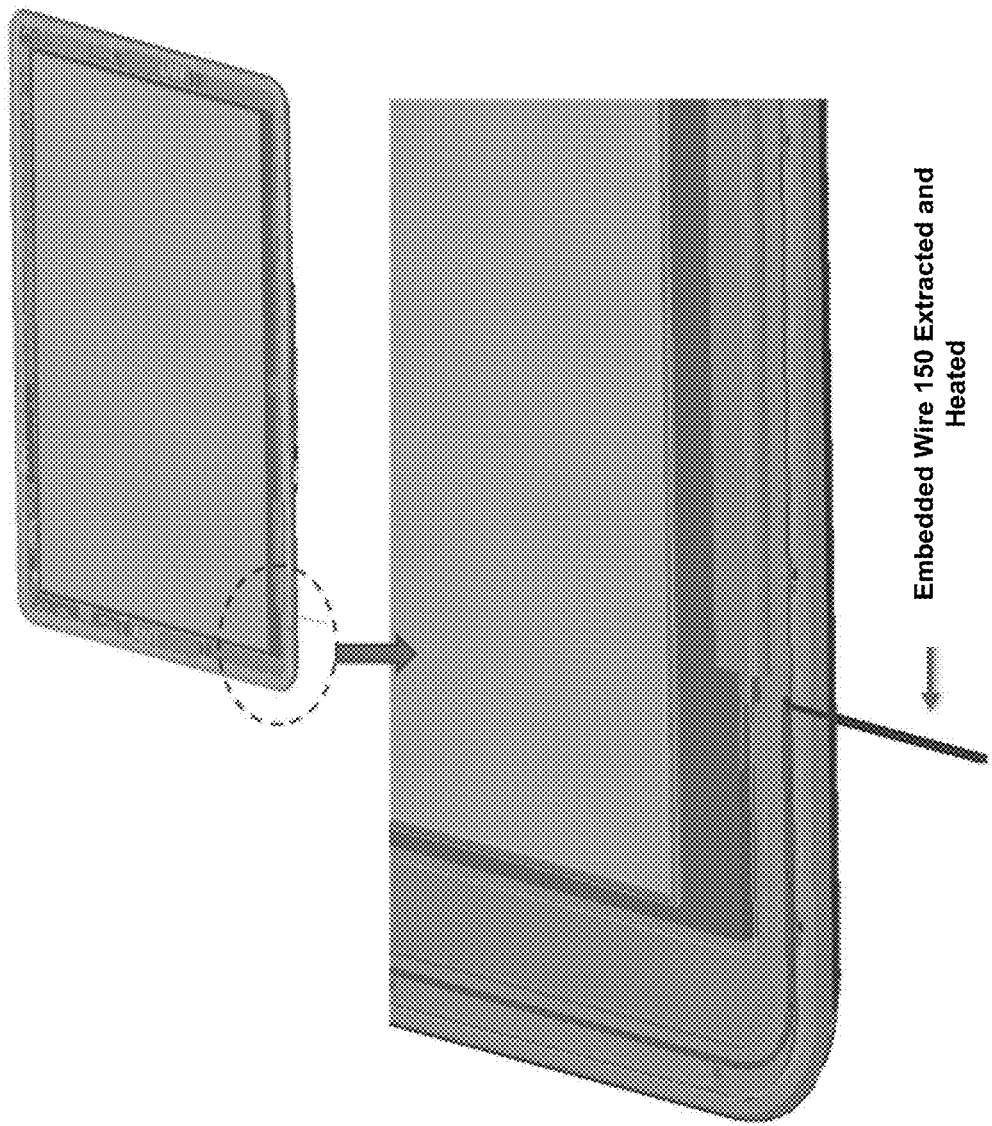
FIG. 3 illustrates an exploded view of a tablet with an extracted wire, according to an embodiment.

FIG. 3 illustrates an exploded view of a tablet with an extracted wire, according to an embodiment. As previously mentioned, embodiments discussed herein are not limited to tablets and may applied to different types of computing systems (such as those discussed with reference to FIGS. 5-8), including mobile computing device(s) (for example, a smartphone, UMPC (Ultra-Mobile Personal Computer), laptop computer, Ultrabook™ computing device, wearable device (such as a smart watch, smart glasses, a smart bracelet, and the like), etc., and/or non-mobile computing devices including a desktop computer, workstation, computer server (such as a blade server), etc. Referring to FIG. 3, the embedded wire 150 is extracted and ready for application of heat (e.g., via application of electrical voltage and/or current) to separate the display assembly from the chassis.

Figure 4A:
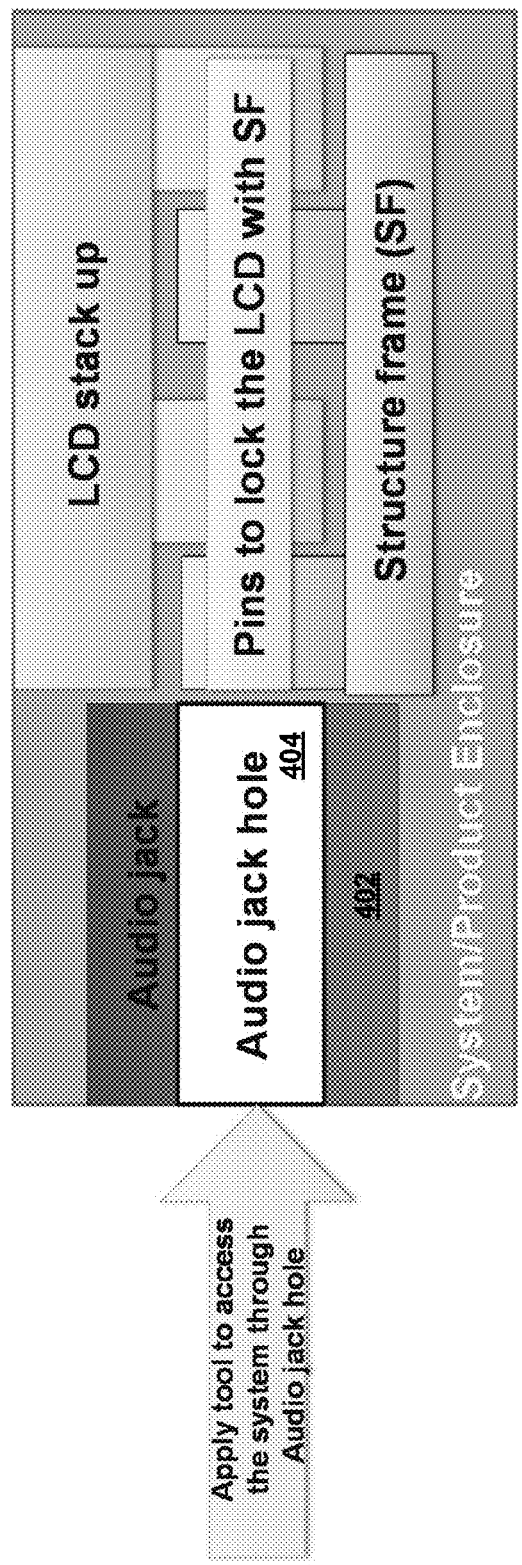
FIGS. 4A-4C illustrate block diagrams for utilizing various techniques for accessing a fastener through an audio jack hole of a computing device, according to some embodiments.
Figure 4B:
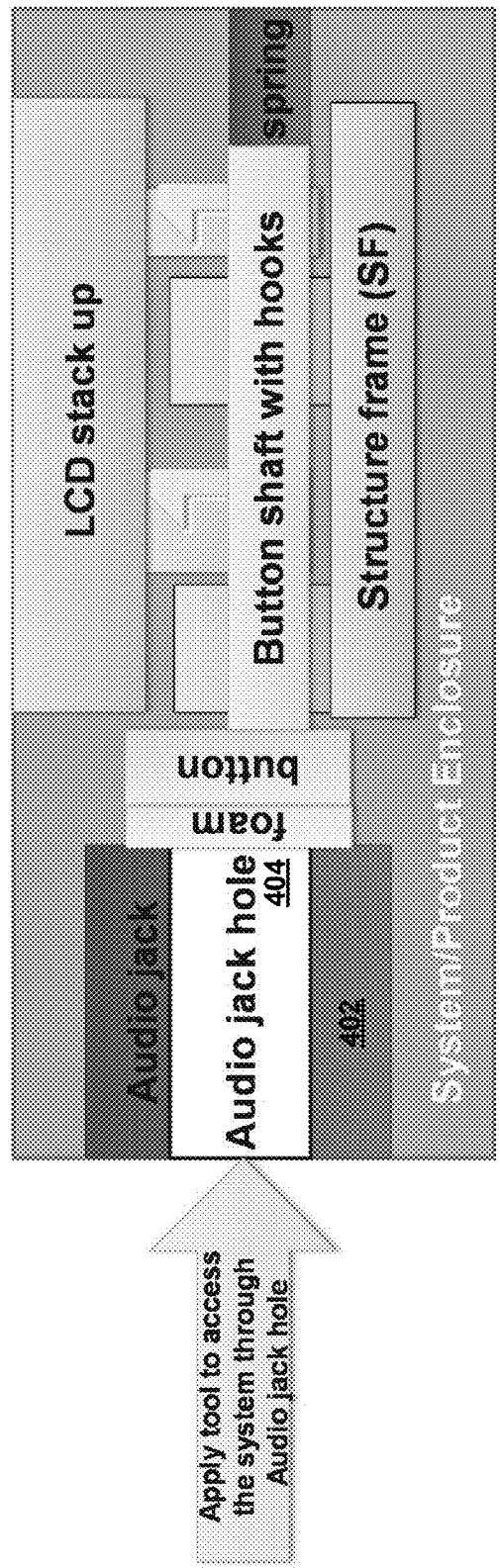
Figure 4C:
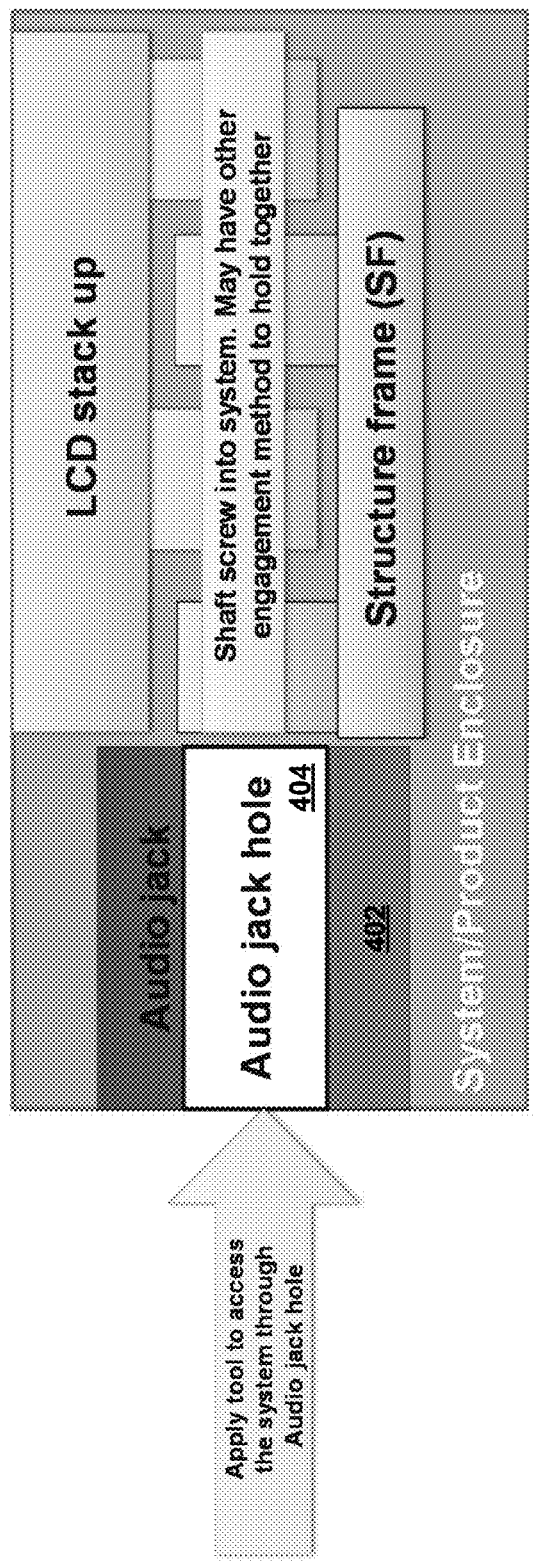

FIGS. 4A-4C illustrate block diagrams for utilizing various techniques for accessing a fastening device (or a fastener) through an audio jack hole of a computing device, according to some embodiments. Utilizing the audio jack hole 404 may allow for access to open/close a product, hide the access area/port/part, reduce or eliminate the need for use of glue (or other bonding material) to close a device enclosure. Moreover, a pin, button, screw, shaft, or other types of a fastener, etc. is hidden behind the audio jack hole 404 (which is already available in most if not all mobile computing devices). This will allow the mobile device to have seamless look, while still being serviceability, upgradeable, and/or reworkable in production or in the field via the hidden feature. Hence, some embodiments provide seamless access for opening/accessing a product, e.g., for service, upgrade, debug, reworking, etc.

While some embodiments are discussed herein with reference to the audio jack hole 404, other opening (or hole, e.g., with or without a cover or plug) may be used for this hidden feature. In an embodiment, a pre-existing hole or opening is used, e.g., to reduce manufacturing costs. As an example, the hidden feature may be implemented behind a locking pin or locking hole, a data communication port (such as a network, phone, etc. port). To hide the fastening device, it may be coupled at a first end of an opening (or hole) in a computing device, where the second end of the opening (or hole) is open such that a tool may be inserted from the second end to engage the fastening device. This can be done while the hole or opening retains its original purpose, e.g., to provide an audio signal communication, security locking, or data signal communication functionality. In an embodiment, the length of this hole between the first end and the second end may be relatively longer than its width at the first or second ends to effectively hide the fastening device.

More particularly, FIG. 4A shows how a tool may be applied via an audio jack hole 404 to access the system through one or more pins that lock the LCD (Liquid Crystal Display, or more generally a flat panel display) with the Structure Frame (SF). FIG. 4B shows how a tool may be applied via the audio jack hole 404 to access the system through a button shaft (e.g., with one or more hooks and/or spring) that locks the LCD with the structure frame. For example, foam may be provided between the button and the tool (such as shown in FIG. 4B) to physically isolate the button movement (and/or for making the computing device water resistant or water proof). Also, a spring (such as the one shown) may be optionally provided to allow for automatic retraction of the button when the button is depressed by the tool.

FIG. 4C shows how a tool (such as a screw driver) may be applied via the audio jack hole 404 to access the system through a shaft screw (e.g., which may have other types of engagement also such as those discussed with reference to FIGS. 4A and/or 4B) that to lock or fasten the LCD with the structure frame. Hence, the mechanisms discussed with reference to FIGS. 4A-4C are hidden, so they not require any additional holes on the computing device. Also, these mechanisms may be used to water seal the hole (e.g., audio jack hole or the lock pin hole).

Figure 5:
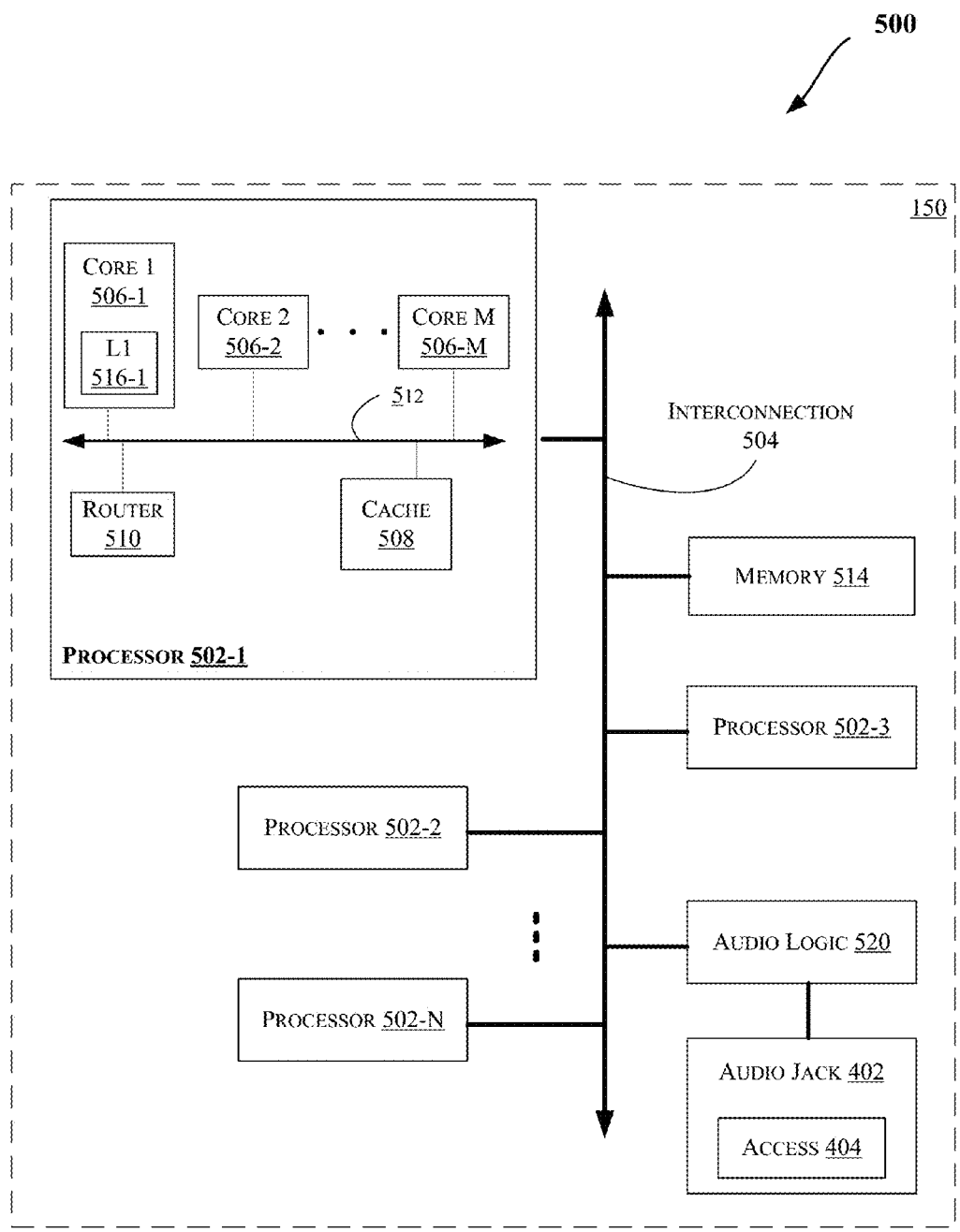
FIGS. 5-8 illustrate block diagrams of embodiments of computing systems, which may be utilized to implement various embodiments discussed herein.

Some embodiments may be applied in computing systems that include one or more processors (e.g., with one or more processor cores), such as those discussed with reference to FIGS. 5-8, including for example mobile computing devices such as a smartphone, tablet, UMPC (Ultra-Mobile Personal Computer), laptop computer, Ultrabook™ computing device, wearable devices (such as smart watch, smart glasses, smart bracelets, and the like), etc. More particularly, FIG. 5 illustrates a block diagram of a computing system 500, according to an embodiment. As shown, system 500 may include the embedded wire 150, audio logic 520 (e.g., to facilitate audio features), audio jack 402, and/or access (or audio jack hole) 404.

System 500 may include one or more processors 502-1 through 502-N (generally referred to herein as "processors 502" or "processor 502"). The processors 502 may be general-purpose CPUs (Central Processing Units) and/or GPUs (Graphics Processing Units) in various embodiments. The processors 502 may communicate via an interconnection or bus 504. Each processor may include various components some of which are only discussed with reference to processor 502-1 for clarity. Accordingly, each of the remaining processors 502-2 through 502-N may include the same or similar components discussed with reference to the processor 502-1.

In an embodiment, the processor 502-1 may include one or more processor cores 506-1 through 506-M (referred to herein as "cores 506," or "core 506"), a cache 508, and/or a router 510. The processor cores 506 may be implemented on a single integrated circuit (IC) chip. Moreover, the chip may include one or more shared and/or private caches (such as cache 508), buses or interconnections (such as a bus or interconnection 512), graphics and/or memory controllers (such as those discussed with reference to FIGS. 6-8), or other components.

In one embodiment, the router 510 may be used to communicate between various components of the processor 502-1 and/or system 500. Moreover, the processor 502-1 may include more than one router 510. Furthermore, the multitude of routers 510 may be in communication to enable data routing between various components inside or outside of the processor 502-1.

The cache 508 may store data (e.g., including instructions) that are utilized by one or more components of the processor 502-1, such as the cores 506. For example, the cache 508 may locally cache data stored in a memory 514 for faster access by the components of the processor 502 (e.g., faster access by cores 506). As shown in FIG. 5, the memory 514 may communicate with the processors 502 via the interconnection 504. In an embodiment, the cache 508 (that may be shared) may be a mid-level cache (MLC), a last level cache (LLC), etc. Also, each of the cores 506 may include a Level 1 (L1) cache (516-1) (generally referred to herein as "L1 cache 516") or other levels of cache such as a Level 2 (L2) cache. Moreover, various components of the processor 502-1 may communicate with the cache 508 directly, through a bus (e.g., the bus 512), and/or a memory controller or hub.

Figure 6:
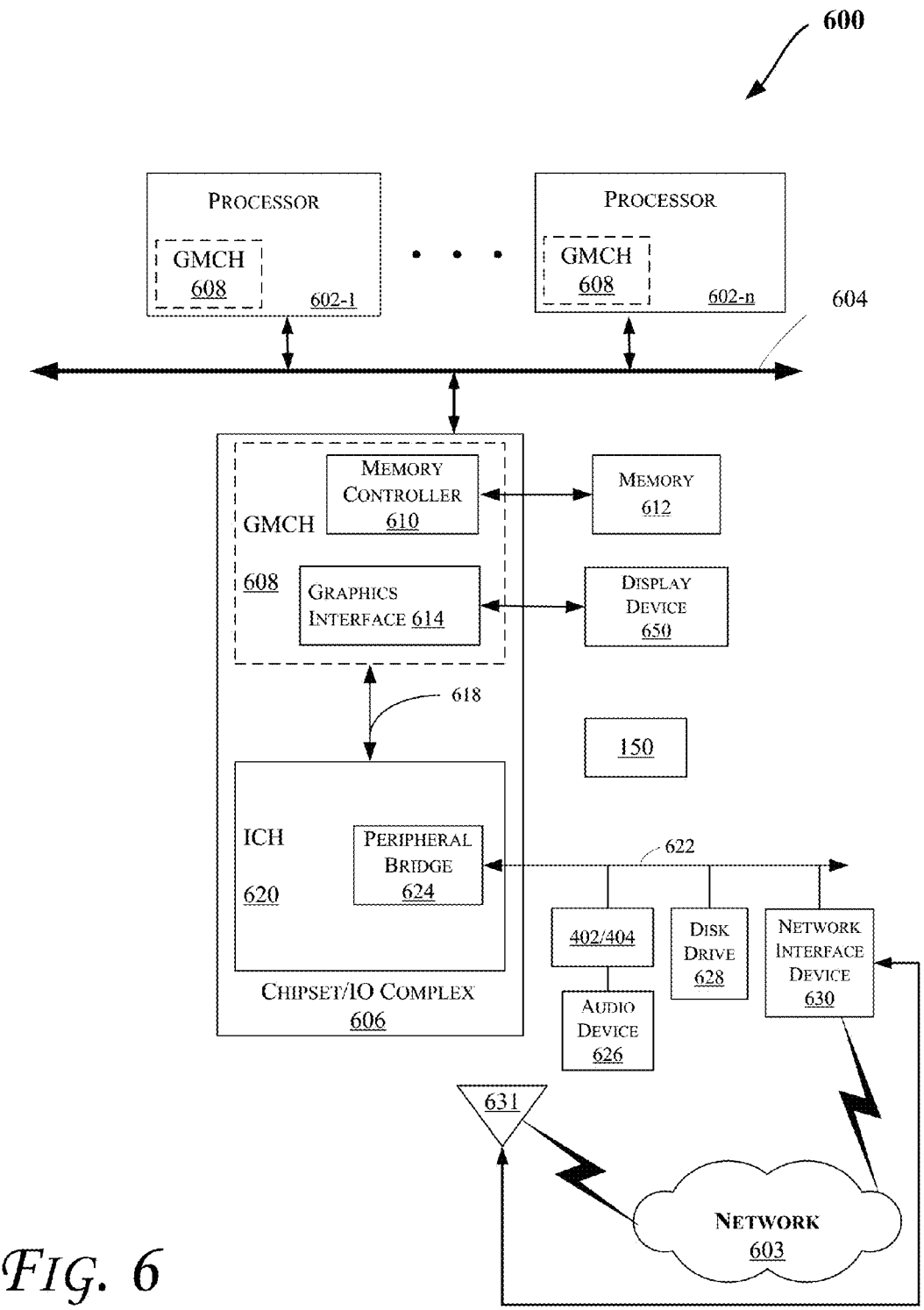

FIG. 6 illustrates a block diagram of a computing system 600 in accordance with an embodiment. As shown, system 600 may include the embedded wire 150, audio jack 402, and/or access (or audio jack hole) 404. Computing system 600 may include one or more Central Processing Units (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)).

Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 502 of FIG. 5. Also, the operations discussed with reference to FIGS. 1-5 may be performed by one or more components of the system 600.

A chipset 606 may also communicate with the interconnection network 604. The chipset 606 may include a graphics memory control hub (GMCH) 608, which may be located in various components of system 600 (such as those shown in FIG. 6). The GMCH 608 may include a memory controller 610 that communicates with a memory 612 (which may be the same or similar to the memory 514 of FIG. 5). The memory 612 may store data, including sequences of instructions, that may be executed by the CPU 602, or any other device included in the computing system 600. In one embodiment, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The GMCH 608 may also include a graphics interface 614 that communicates with the display device. In one embodiment, the graphics interface 614 may communicate with a display device via an accelerated graphics port (AGP) or Peripheral Component Interconnect (PCI) (or PCI express (PCIe) interface). In an embodiment, the display (such as a flat panel display) may communicate with the graphics interface 614 through, for example, a signal converter that translates a digital representation of an image stored in a storage device such as video memory or system memory into display signals that are interpreted and displayed by the display device. The display signals produced by the display device may pass through various control devices before being interpreted by and subsequently displayed on the display device.

A hub interface 618 may allow the GMCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. As shown, the network interface device 630 may be coupled to an antenna 631 to wirelessly (e.g., via an Institute of Electrical and Electronics Engineers (IEEE) 802.11 interface (including IEEE 802.11a/b/g/n/ac, etc.), cellular interface, 3G, 5G, LPE, etc.) communicate with the network 603. Other devices may communicate via the bus 622. Also, various components (such as the network interface device 630) may communicate with the GMCH 608. In addition, the processor 602 and the GMCH 608 may be combined to form a single chip. Furthermore, a graphics accelerator may be included within the GMCH 608 in other embodiments.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
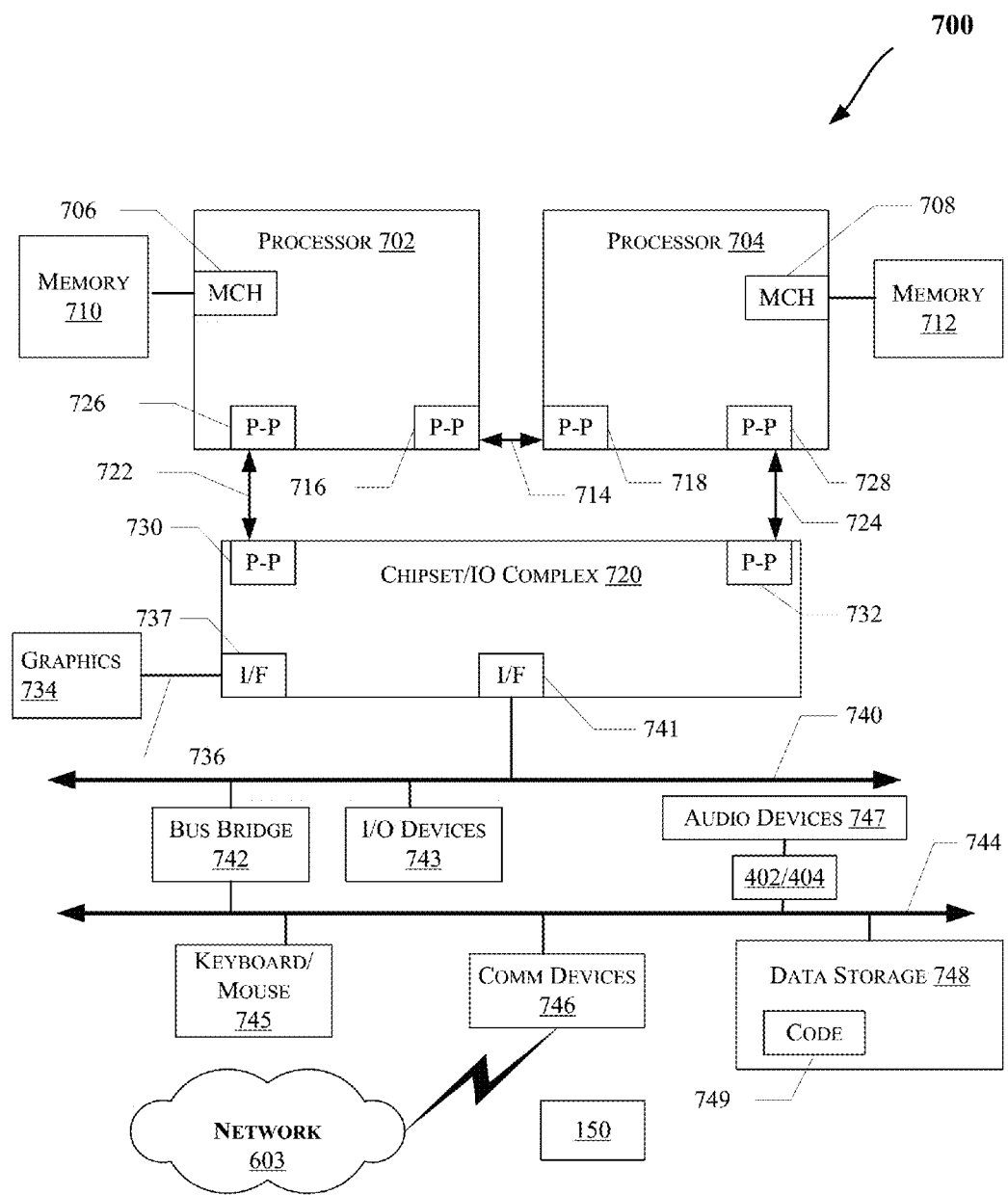

FIG. 7 illustrates a computing system 700 that is arranged in a point-to-point (PtP) configuration, according to an embodiment. In particular, FIG. 7 shows a system where processors, memory, and input/output devices are interconnected by a number of point-to-point interfaces. The operations discussed with reference to FIGS. 1-6 may be performed by one or more components of the system 700. As shown, system 700 may include the embedded wire 150, audio jack 402, and/or access (or audio jack hole) 404

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a graphics circuit 734 via a graphics interface 736, e.g., using a PtP interface circuit 737.

The chipset 720 may communicate with a bus 740 using a PtP interface circuit 741. The bus 740 may communicate with one or more devices, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device 747, and/or a data storage device 748. The data storage device 748 may store code 749 that may be executed by the processors 702 and/or 704.

Figure 8:
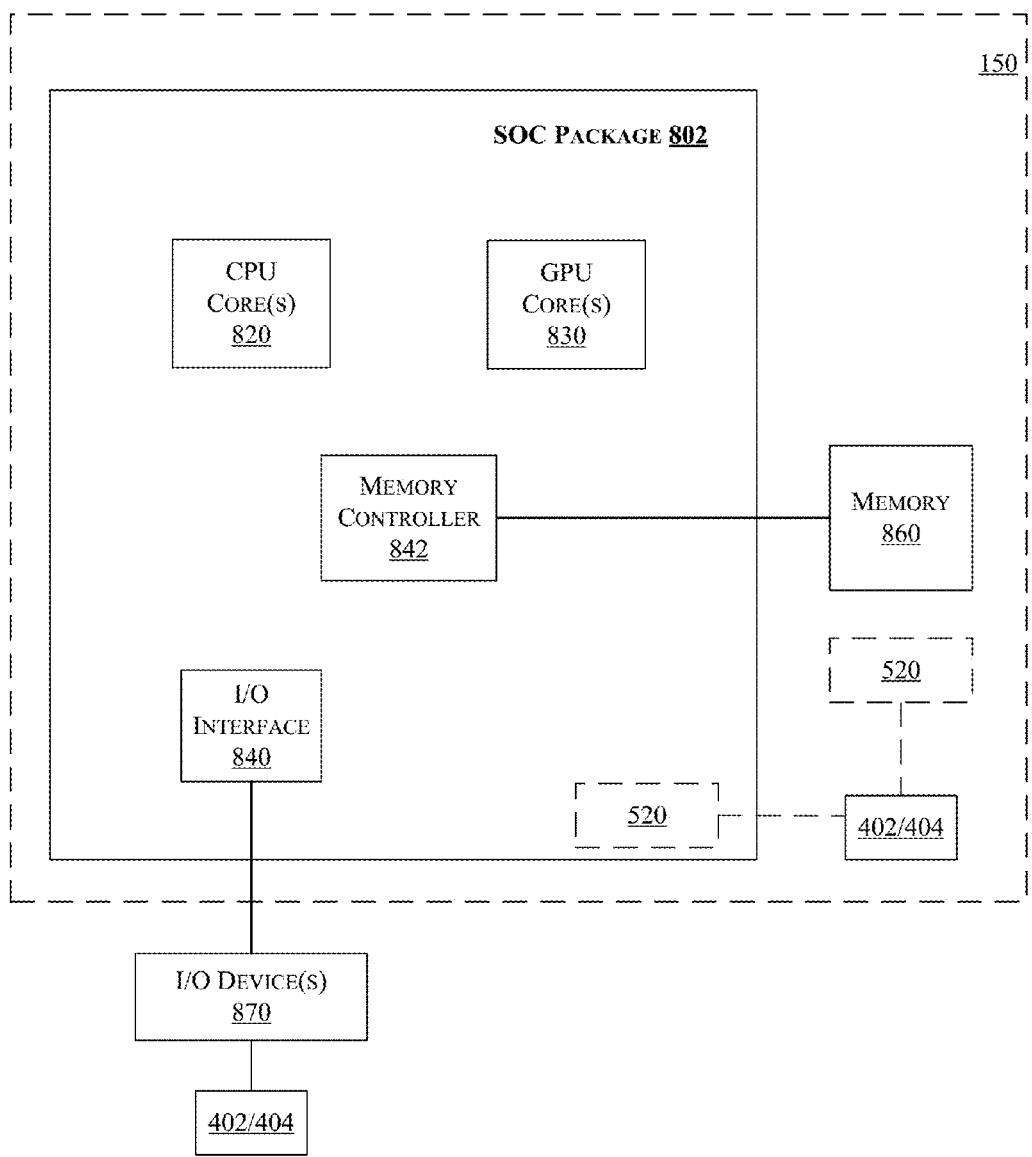

In some embodiments, one or more of the components discussed herein can be embodied as a System On Chip (SOC) device. FIG. 8 illustrates a block diagram of an SOC package in accordance with an embodiment. As illustrated in FIG. 8, SOC 802 includes one or more Central Processing Unit (CPU) cores 820, one or more Graphics Processing Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 820 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 (which may be similar to or the same as memory discussed herein with reference to the other figures) via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display device, an image/video capture device (such as a camera or camcorder/video recorder), a touch screen, a speaker, or the like. Furthermore, As shown, the system of FIG. 8 may include the embedded wire 150, audio jack 402, and/or access (or audio jack hole) 404. Also, Moreover, the scenes, images, or frames discussed herein (e.g., which may be processed by the graphics logic in various embodiments) may be captured by an image capture device (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene are designed/generated on a computer in some embodiments. Also, one or more of the frames of the scene may be presented via a display (such as the display discussed with reference to FIGS. 6 and/or 7, including for example a flat panel display device, etc.).

The following examples pertain to further embodiments. Example 1 includes 1 includes an apparatus comprising: a wire physically adjacent to an adhesive, wherein the adhesive is to bond a first portion of a computing device and a second portion of the computing device, wherein the wire is capable to be heated in response to application of electrical voltage or current, wherein the heated wire is to cause cutting of the adhesive to allow for physical separation of the first portion of the computing device and the second portion of the computing device. Example 2 includes the apparatus of example 1, wherein the wire is to comprise one or more of: Nichrome wire, Nitinol wire, nickel or nickel alloy wire, cooper or copper alloy wire, aluminum or aluminum alloy wire, silver or silver alloy) wire, or alloys thereof. Example 3 includes the apparatus of example 1, wherein the wire is capable of sustaining a sufficient amount of heat or temperature for a sufficient duration to effectively cut through the adhesive. Example 4 includes the apparatus of example 1, wherein shrinkage of the wire, due to the application of the electrical voltage or current, is limited to about four percent of its length. Example 5 includes the apparatus of example 1, further comprising a pocket to store a portion of the wire. Example 6 includes the apparatus of example 1, wherein the first portion of the computing device is to comprise a display assembly. Example 7 includes the apparatus of example 6, wherein the display assembly is to comprise a flat panel display. Example 8 includes the apparatus of example 1, wherein the second portion of the computing device is to comprise a device chassis or a device cover. Example 9 includes the apparatus of example 1, wherein the computing device is to comprise a mobile computing device. Example 10 includes the apparatus of example 9, wherein the mobile computing device is to comprise one or more of: a System On Chip (SOC) device; a processor, having one or more processor cores; a flat panel display device, and memory. Example 11 includes the apparatus of example 9, wherein the mobile computing device is to comprise one of: a smartphone, tablet, UMPC (Ultra-Mobile Personal Computer), laptop computer, Ultrabook™ computing device, and a wearable device. Example 12 includes the apparatus of example 11, wherein the wearable device is to comprise one of a smart watch, smart glasses, or a smart bracelet.

Example 13 includes an apparatus comprising: a fastening device coupled to a first end of an opening in a computing device, wherein the fastening device is to be accessible from a second end of the opening while the opening retains its original functionality, wherein the fastening device is to couple a first portion of the computing device and a second portion of the computing device. Example 14 includes the apparatus of example 13, wherein the fastening device is to comprise: a pin, button, screw, shaft, or combinations thereof. Example 15 includes the apparatus of example 13, wherein the second end of the opening is on an opposite end of the opening from the first end of the opening. Example 16 includes the apparatus of example 13, wherein the original functionality is to comprise an audio signal communication functionality, a data communication functionality, or security locking functionality. Example 17 includes the apparatus of example 13, wherein the first portion of the computing device is to comprise a display assembly. Example 18 includes the apparatus of example 17, wherein the display assembly is to comprise a flat panel display. Example 19 includes the apparatus of example 13, wherein the second portion of the computing device is to comprise a device chassis or a device cover. Example 20 includes the apparatus of example 13, wherein the computing device is to comprise a mobile computing device. Example 21 includes the apparatus of example 20, wherein the mobile computing device is to comprise one or more of: a System On Chip (SOC) device; a processor, having one or more processor cores; a flat panel display device, and memory. Example 22 includes the apparatus of example 20, wherein the mobile computing device is to comprise one of: a smartphone, tablet, UMPC (Ultra-Mobile Personal Computer), laptop computer, Ultrabook™ computing device, and a wearable device. Example 23 includes the apparatus of example 22, wherein the wearable device is to comprise one of a smart watch, smart glasses, or a smart bracelet.

Example 24 includes a computing system comprising: a processor having one or more processor cores; and a wire physically adjacent to an adhesive, wherein the adhesive is to bond a first portion of the computing system and a second portion of the computing system, wherein the wire is capable to be heated in response to application of electrical voltage or current, wherein the heated wire is to cause cutting of the adhesive to allow for physical separation of the first portion of the computing system and the second portion of the computing system. Example 25 includes the system of example 24, wherein the wire is to comprise one or more of: Nichrome wire, Nitinol wire, nickel or nickel alloy wire, cooper or copper alloy wire, aluminum or aluminum alloy wire, silver or silver alloy) wire, or alloys thereof. Example 26 includes the system of example 24, wherein the wire is capable of sustaining a sufficient amount of heat or temperature for a sufficient duration to effectively cut through the adhesive.

Example 27 includes a computing system comprising: a processor having one or more processor cores; and a fastening device coupled to a first end of an opening in the computing system, wherein the fastening device is to be accessible from a second end of the opening while the opening retains its original functionality, wherein the fastening device is to couple a first portion of the computing system and a second portion of the computing system. Example 28 includes the system of example 27, wherein the fastening device is to comprise: a pin, button, screw, shaft, or combinations thereof. Example 29 includes the system of example 27, wherein the second end of the opening is on an opposite end of the opening from the first end of the opening. Example 30 includes an apparatus comprising means to perform a method as set forth in any preceding example.

In various embodiments, the operations discussed herein, e.g., with reference to FIGS. 1-8, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-8.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
 a wire directly disposed on a portion of a chassis of a computing device;
 an adhesive directly disposed on the wire;
 a display assembly directly disposed on the adhesive;
 wherein the wire is capable to be heated in response to application of electrical voltage or current, wherein the heated wire is to cause cutting of the adhesive to allow for physical separation of the display assembly from the chassis, wherein the computing device chassis comprises an opening to access the wire.

2. The apparatus of claim 1, wherein the wire is to comprise one or more of: a non-magnetic alloy of nickel, an alloy comprising nickel and titanium, nickel or nickel alloy wire, copper or copper alloy wire, aluminum or aluminum alloy wire, silver or silver alloy) wire, or alloys thereof.

3. The apparatus of claim 1, wherein the wire is capable of sustaining a sufficient amount of heat or temperature for a sufficient duration to effectively cut through the adhesive.

4. The apparatus of claim 1, wherein shrinkage of the wire, due to the application of the electrical voltage or current, is limited to about four percent of its length.

5. The apparatus of claim 1, wherein the chassis comprises a pocket to store a portion of the wire.

6. The apparatus of claim 1, wherein the display assembly is to comprise a flat panel display.

7. The apparatus of claim 1, wherein the computing device is to comprise a mobile computing device.

8. The apparatus of claim 7, wherein the mobile computing device is to comprise one or more of: a System On Chip (SOC) device; a processor, having one or more processor cores; a flat panel display device, and memory.

9. The apparatus of claim 7, wherein the mobile computing device is to comprise one of: a smartphone, tablet, UMPC (Ultra-Mobile Personal Computer), and a laptop computer.

10. The apparatus of claim 7, wherein the mobile computing device comprises a wearable device, wherein the wearable device comprises one of a smart watch, smart glasses, or a smart bracelet.

* * * * *